(12) United States Patent
Exner et al.

(10) Patent No.: US 11,711,710 B2
(45) Date of Patent: Jul. 25, 2023

(54) COORDINATOR ELECTRONIC DEVICE, A SENSOR DEVICE, AND RELATED METHODS

(71) Applicant: Sony Corporation, Tokyo (JP)

(72) Inventors: Peter Exner, Malmö (SE); Anders Isberg, Åkarp (SE)

(73) Assignee: Sony Corporation, Tokyo (JP)

(*) Notice: Subject to any disclaimer, the term of this patent is extended or adjusted under 35 U.S.C. 154(b) by 27 days.

(21) Appl. No.: 17/149,494

(22) Filed: Jan. 14, 2021

(65) Prior Publication Data

US 2021/0266771 A1 Aug. 26, 2021

(30) Foreign Application Priority Data

Feb. 20, 2020 (SE) .................................. 2050188-8

(51) Int. Cl.
| | | |
|---|---|---|
| H04W 24/10 | (2009.01) | |
| H04W 52/02 | (2009.01) | |
| H04W 88/08 | (2009.01) | |
| H04W 72/20 | (2023.01) | |
| H04W 72/23 | (2023.01) | |

(52) U.S. Cl.
CPC ....... *H04W 24/10* (2013.01); *H04W 52/0216* (2013.01); *H04W 72/20* (2023.01); *H04W 72/23* (2023.01); *H04W 88/08* (2013.01)

(58) Field of Classification Search
CPC ............. H04W 24/10; H04W 52/0216; H04W 72/042; H04W 72/1278; H04W 88/08; H04L 67/125; H04L 67/34; H04L 67/51; H04L 67/12
See application file for complete search history.

(56) References Cited

U.S. PATENT DOCUMENTS

| 7,927,167 | B2 | 4/2011 | Horie | |
| 8,199,686 | B1* | 6/2012 | Donovan | H04W 76/28 |
| | | | | 455/343.2 |
| 8,452,572 | B2 | 5/2013 | Vasseur | |
| 2006/0084407 | A1* | 4/2006 | Li | H04B 1/1615 |
| | | | | 455/343.1 |
| 2006/0116170 | A1* | 6/2006 | Brahmbhatt | H04W 12/03 |
| | | | | 455/560 |

(Continued)

FOREIGN PATENT DOCUMENTS

| EP | 3416431 A1 | 12/2018 |
| KR | 101355228 B1 | 1/2014 |

(Continued)

OTHER PUBLICATIONS

Swedish Office Action with Swedish Search Report from corresponding Swedish Application No. 2050188-8, dated Sep. 30, 2020, 8 pages.

*Primary Examiner* — Ayaz R Sheikh
*Assistant Examiner* — Tarell A Hampton
(74) *Attorney, Agent, or Firm* — Tucker Ellis LLP

(57) ABSTRACT

A coordinator electronic device includes a memory circuitry, a processor circuitry, and an interface circuitry. The processor circuitry is configured to obtain sensor data from a first sensor device. The processor circuitry is configured to provide to the first sensor device, based on the sensor data obtained, a first configuration parameter indicative of scheduling of reporting from the first sensor device.

20 Claims, 8 Drawing Sheets

(56) References Cited

U.S. PATENT DOCUMENTS

| | | | |
|---|---|---|---|
| 2007/0263856 A1* | 11/2007 | Parsa | H05K 1/14 |
| | | | 379/413.04 |
| 2008/0150714 A1 | 6/2008 | Bauer | |
| 2012/0026925 A1* | 2/2012 | Vempati | H04W 52/0229 |
| | | | 455/522 |
| 2013/0308514 A1* | 11/2013 | Yokoyama | H04W 52/0206 |
| | | | 370/311 |
| 2018/0213348 A1 | 7/2018 | Natarajan | |

FOREIGN PATENT DOCUMENTS

| | | |
|---|---|---|
| WO | 2006038163 A1 | 4/2006 |
| WO | 2018100383 A1 | 6/2018 |

* cited by examiner

COORDINATOR ELECTRONIC DEVICE, A SENSOR DEVICE, AND RELATED METHODS

RELATED APPLICATION DATA

This application claims the benefit of Swedish Patent Application No. 2050188-8, filed Feb. 20, 2020, the disclosure of which is incorporated herein by reference in its entirety.

TECHNICAL FIELD

The present disclosure pertains to the field of Internet of things and relates to a coordinator electronic device, a sensor device and to methods for scheduling sensor data reporting.

BACKGROUND

There are many scenarios where electronic devices (such as Internet of things, IoT, devices) need to perform some sensing tasks and report measured values to a server (such as a cloud server).

Power optimization is a challenging aspect of the design of electronic devices such as connected devices and IoT, devices. It may be challenging to reduce energy consumption of electronic devices for example to ensure that a battery powered electronic device may be working for its intended operation time.

SUMMARY

As an example, electronic devices (such as sensor devices) in a smart tracking case may be configured to report data (such as sensor data, for example position and temperature data, such as position and temperature of goods, environment data, and/or motion data). For example, in scenarios where one or more sensor devices (such as multiple trackers) share the same space (such as loaded on a truck or in a warehouse), the one or more sensor devices may thereby be reporting similar values.

Accordingly, there is a need for coordinator electronic devices, sensor devices, and methods for scheduling sensor data reporting, which mitigate, alleviate or address the shortcomings existing and provide an improved scheduling of sensor data reporting, such that the power consumption and the network traffic (such as amount of transferred data, used bandwidth, and/or traffic overhead) are reduced for electronic devices, such as coordinator electronic devices and sensor devices.

The present disclosure provides a coordinator electronic device. The coordinator electronic device comprises a memory circuitry, an interface circuitry, and a processor circuitry. The processor circuitry is configured to obtain sensor data from a first sensor device. The processor circuitry is configured to provide to the first sensor device, based on the sensor data obtained, a first configuration parameter indicative of scheduling of reporting from the first sensor device.

Further, a sensor device is provided. The sensor device comprises a memory circuitry, an interface circuitry, and a processor circuitry. The processor circuitry is configured to provide sensor data to a coordinator electronic device. The processor circuitry is configured to receive, from the coordinator electronic device, based on the sensor data, a configuration parameter indicative of scheduling of reporting from the sensor device.

Further, a method, performed by a coordinator electronic device, for scheduling sensor data reporting, is provided. The method comprises obtaining the sensor data from a first sensor device. The method comprises providing to the first sensor device, based on the sensor data obtained, a first configuration parameter indicative of scheduling of reporting from the first sensor device.

Further, a method, performed by a sensor device, for scheduling sensor data reporting is provided. The method comprises providing the sensor data to a coordinator electronic device. The method comprises receiving, from the coordinator electronic device, based on the sensor data, a configuration parameter indicative of scheduling of reporting from the sensor device.

Further, an advantage of the present disclosure is that the sensing of the one or more sensor devices may be done in a more efficient and collaborative manner. This may be achieved by having multiple sensor devices collaborating (such as working together) on measuring a first measurement parameter (such as collaborating on generating sensor data, for example a sensing task) and/or collaborating on providing sensor data to the coordinator electronic device.

An advantage of the present disclosure is that the network traffic (such as amount of transferred data and/or used bandwidth) may be reduced for the coordinator electronic device and/or the sensor device.

Further, an advantage of the present disclosure is that an autonomous or automatic scheduling of reporting of sensor devices and/or re-clustering of the one or more sensor devices may be achieved.

The above advantages may provide an improved data reporting with reduced power consumption (such as minimized and/or decreased power consumption or power usage), while keeping a reliable and precise data reporting. In other words, the disclosed sensor device and coordinator electronic device and methods allow on-device, continuous adaptation and optimization of the configuration parameters (for example optimization of the sensor data reporting) by exploiting the scheduling reporting.

It is an advantage of the present disclosure that the power consumption of the coordinator electronic device and/or of the sensor device may be reduced. This may be achieved by optimizing the data reporting, such as to reduce unnecessary reporting from the sensor device and/or the coordinator device. Further, the reduction of power consumption may be achieved by minimizing the sensing of the sensor device (such as minimizing the sensing of each of a plurality of sensor devices). For example, the frequency of the sensing of individual sensor devices may be minimized, while keeping the frequency of the sensing from the clustered sensor devices as a whole.

Further, the reduction of power consumption may be achieved by enabling the sensor device to enter a power saving mode at relevant times

BRIEF DESCRIPTION OF THE DRAWINGS

The above and other features and advantages of the present disclosure will become readily apparent to those skilled in the art by the following detailed description of example embodiments thereof with reference to the attached drawings, in which.

DETAILED DESCRIPTION

Figure 1A:
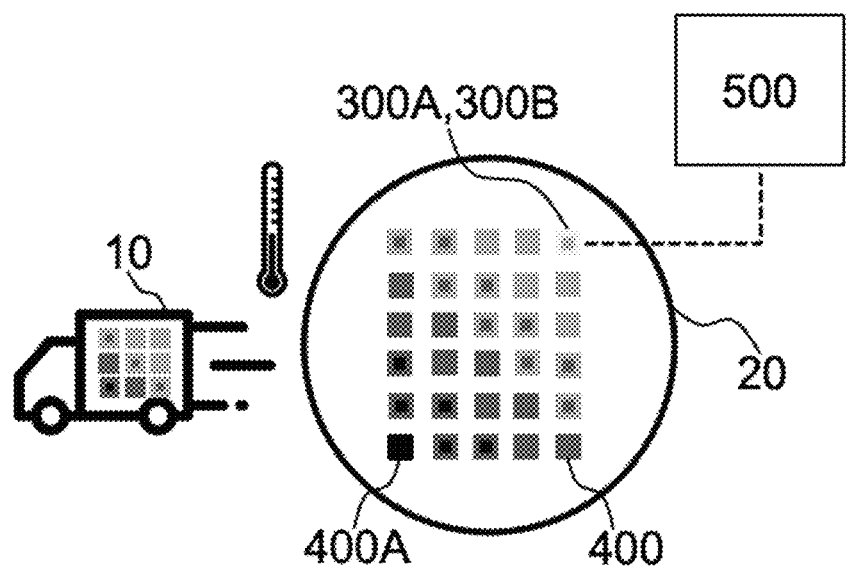
FIGS. 1A-1B are diagrams illustrating an example scenario for scheduling sensor data reporting according to one or more embodiments of this disclosure.

Various example embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the disclosure or as a limitation on the scope of the disclosure.

In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

The figures are schematic and simplified for clarity, and they merely show details which aid understanding the disclosure, while other details have been left out. Throughout, the same reference numerals are used for identical or corresponding parts.

Figure 1B:
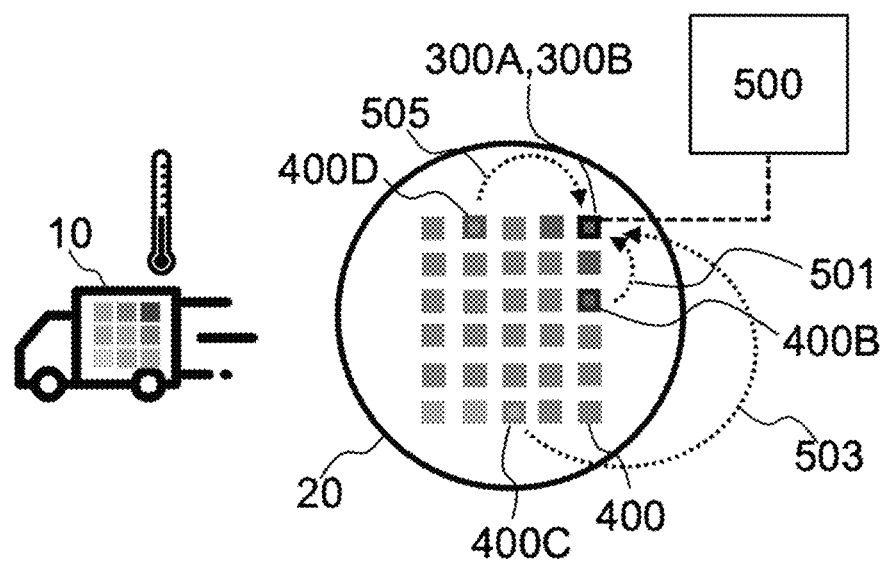

FIGS. 1A-1B are diagrams illustrating an example scenario for scheduling sensor data reporting according to one or more embodiments of this disclosure. FIGS. 1A-1B show sensor devices 400, 400A in a smart tracking case. The sensor devices 400, 400A may be configured to report data, such as sensor data, (for example position data and environment data, such as temperature data, such as position and temperature of goods, and/or motion data).

FIGS. 1A-1B show a coordinator electronic device 300A, 300B which is configured to obtain sensor data from the sensor devices 400, 400A. The coordinator electronic device 300A, 300B may configured to communicate with a network 500, such as a cellular network, such as Long-Term Evolution, such as 5G, in order to for example connect with a data acquisition server.

The present disclosure proposes the disclosed coordinator electronic device to form one or more scheduling groups (such as one or more clusters) of sensor devices based on the sensor data. A scheduling group may be formed by the coordinator electronic device based on one or more values indicated the sensor data. A scheduling group may be seen as a group of sensor devices, wherein the group is used for scheduling the sensor device for sensor data reporting. For example, in FIG. 1A, sensor devices 400A forms part of a first scheduling group while sensor device 400 forms part of a second scheduling group, different from the first scheduling group. This may reflect that some parts of the vehicle 10 have a temperature different from another part of the vehicle, which may lead to various temperatures and thereby scheduling groups. In FIGS. 1A-1B the one or more scheduling groups are associated with a cluster 20. Optionally, the one or more scheduling groups may be associated with one or more clusters (for example one cluster per scheduling group).

In one or more embodiments, a sensor device may act as a coordinator electronic device as illustrated in FIGS. 1A-1B. In one or more embodiments, the coordinator electronic device may be part of a vehicle computing device of the vehicle.

The disclosed coordinator electronic device 300A, 300B is configured to provide to the one or more sensor devices 400, 400A, based on the sensor data obtained, a configuration parameter indicative of scheduling of reporting from the sensor device one or more sensor devices 400, 400A. The configuration parameter for sensor device 400 is different from the configuration parameter for sensor device 400A because the sensor devices 400, 400A are not part of the same scheduling group, as illustrated by the grey colour scale in FIGS. 1A-1B. The configuration parameter indicates to the sensor device receiving the configuration parameter, when the sensor device is scheduled to report the sensor data collected.

In FIG. 1B, sensor device 400B transmits sensor data 501 according to the configuration parameter received from the coordinator electronic device 300A, 300B. In FIG. 1B, sensor device 400C transmits sensor data 503 according to the configuration parameter received from the coordinator electronic device 300A, 300B. In FIG. 1B, sensor device 400D transmits sensor data 505 according to the configuration parameter received from the coordinator electronic device 300A, 300B.

For example, sensor data 501 may be reported more frequently than any of sensor data 503, 505. For example, the vehicle 10 is a refrigerating truck where higher temperature are less favorable than lower temperature (for example in comparison with a threshold). It may be envisaged that sensor data 501 is indicative of temperature higher than the temperature indicated in any of sensor data 503, 505.

For example, a local network of electronic devices may use a master device to prevent electronic devices from reporting (such as to pre-empt nodes in a network). There may however be challenges with timing issues in the network (such as when activating and deactivating of electronic devices, for example with traffic overhead in communication). Further, a challenge may be that network latency may cause activation and deactivation (such as sleep and wakeup) timing issues.

An advantage according to some embodiments of the present disclosure may be that both the electronic coordinator device and sensor device, may be configured to enter and/or exiting a power saving mode (such as configured to determine when to enter and/or exit sleep mode in a distributed manner). In other words, the burden of sensing, reporting, and/or data transfer may be shared by the sensor devices and/or the electronic coordinator device in one or more scheduling groups (such as in one or more clusters).

It may be appreciated that the present disclosure provides, in one or more embodiments, a grouping (such as a clustering) of sensor devices within a local network to minimize power usage for sensing, such as for reporting of sensor data.

Figure 2A:
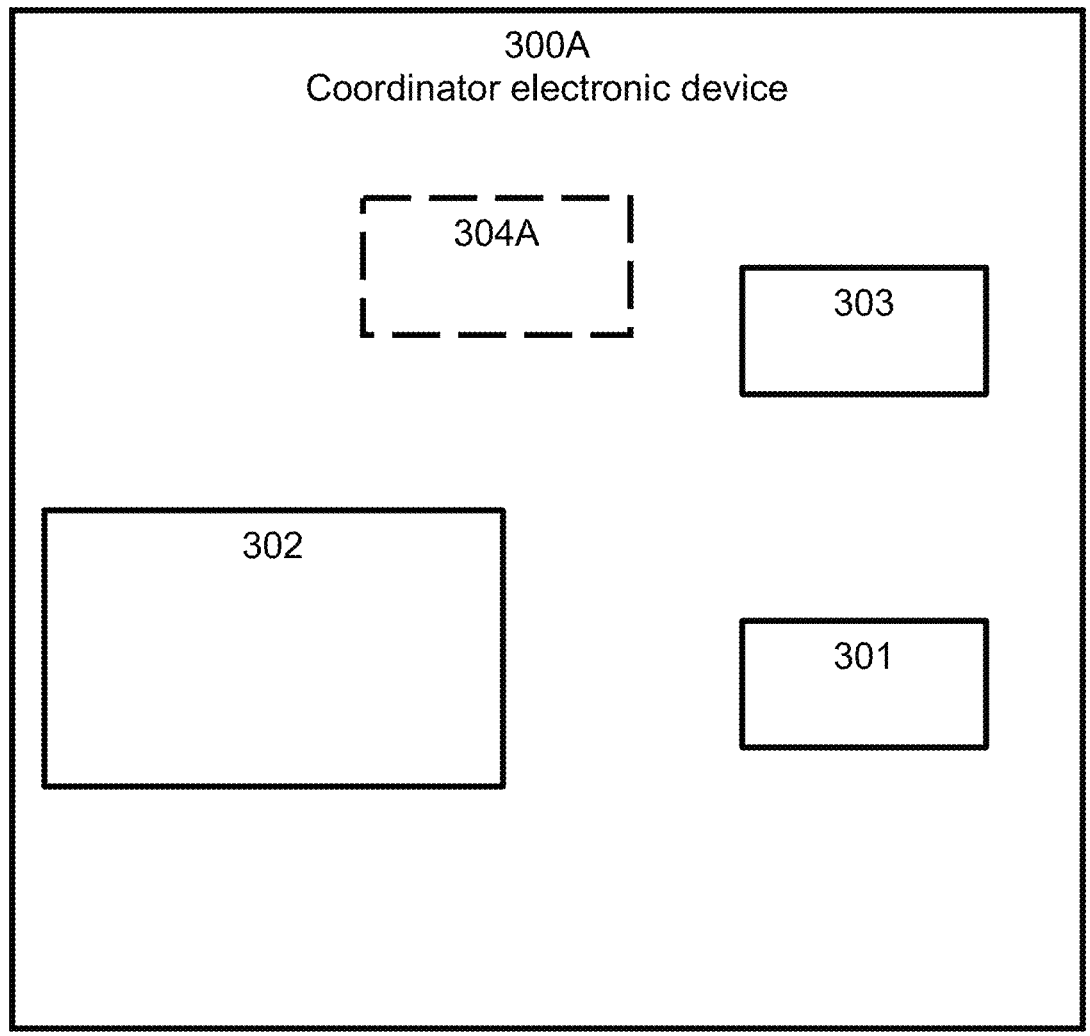
FIG. 2A is a block diagram illustrating an example coordinator electronic device according to this disclosure.

FIG. 2A is a block diagram illustrating an example coordinator electronic device 300A according to some embodiments of the present disclosure.

The coordinator electronic device 300A may for example comprise a portable electronic device, a wireless device, and/or an IoT device. The coordinator electronic device may for example be a master device and/or a collaboration coordinator device.

The coordinator electronic device 300A comprises a memory circuitry 301, a processor circuitry 302, and an interface circuitry 303. In some embodiments, the interface circuitry 303 may be configured to operatively connect the coordinator electronic device to an external network and/or an internal network (such as a local network, for example a network of a coordinator electronic device), for example wirelessly and/or through a wired connection (such as to connect to a cloud network, a cellular network, for example long term evolution, LTE, and/or a local area network, LAN, connection).

The processor circuitry 302 is configured to obtain sensor data from a first sensor device 304A, (such as configured to obtain a current sensed temperature, a reporting frequency, a temperature range, and/or identification of data acquisition server). The sensor data may comprise one or more of: accelerometer data from a sensor device such as an accelerometer, light data from a photo-sensor, sound data (such as voice) data from a microphone, photo or video data from a camera, temperature data from a thermometer, pressure data from a pressure sensor, positioning data from a global positioning system, GPS, and/or humidity data from a hygrometer. The sensor data may comprise identification information (such as ID information), role information (such as indicative of a role of the sensor device), and/or indication of intended purpose (such as indicative of an intended purpose of the sensor device).

Optionally, the first sensor device may comprise one or more of: a thermometer, an accelerometer, a GPS, photo-sensor, a microphone, a camera, a pressure sensor, and a hygrometer.

The processor circuitry 302 is configured to provide to the first sensor device, based on the sensor data obtained, a first configuration parameter indicative of scheduling of reporting from the first sensor device. To provide the first configuration parameter to the first sensor may comprise to assign (such as to allocate, allot, designate and/or set) a scheduling group to the first sensor device. A configuration parameter may be seen as a parameter used by the sensor device to configure, and/or set a scheduling of the reporting of the sensor data. The scheduling of reporting may be seen as allocating resources (such as time resources and/or frequency resources) to the reporting of the sensor data. The scheduling of the reporting enables to coordinate the reporting in organized groups, to provide sensor data to the coordinator electronic device.

In one or more example coordinator electronic devices, the first configuration parameter comprises one or more of: a first identifier indicative of a scheduling group for the first sensor device (such as a cluster, for example a collaboration cluster of one or more sensor devices having an associated or assigned temperature range), a first reporting time slot (such as a future time slot, where the first sensor device will report), a first reporting frequency (such as a reporting frequency based on a reference time and a time delta (such as a time constant that may be added to the reference time)), a first measurement range (such as a first temperature range, a first positioning range, and/or a first light measurement range), and a first identification information of a data acquisition server (such as a cloud server and/or a centre repository). For example, the scheduling group may comprise a cluster of one or more sensor devices (such as one or more thermometers) that measures a measurement parameter (such as temperature) in the same (such as a common) range.

In an illustrative example where the disclosed technique is applied, the sensor device comprises a thermometer, the coordinator electronic device may determine the configuration parameter for example based on the temperature range, such as in the following manner:

TABLE 1

| Scheduling group | Temperature Range (° C.) | Number of sensor devices | Report Frequency (minutes) |
| --- | --- | --- | --- |
| Group 1 | 15-20 | 0 | 5 min |
| Group 2 | 10-15 | 1 | 10 min |
| Group 3 | 8-10 | 3 | 15 min |
| Group 4 | 6-8 | 23 | 60 min |
| Group 5 | −30-6 | 3 | 60 min |

As can be seen in Table 1, the configuration parameter comprises a first reporting frequency for a first measurement range and a first identifier indicative of a scheduling group. For example, the first scheduling group, group 1, may comprise sensor devices measuring temperatures in a first measurement range of 15-20° C., which have a first reporting frequency of 5 min (such as reporting every 5 minutes). As can be seen in the table, there is 0 sensor devices in group 1 (such that no sensor devices are measuring temperatures in the temperature range of 15-20° C.). For example, a second scheduling group, group 2, may comprise sensor devices measuring temperatures in a second measurement range of 10-15° C., which have a second reporting frequency of 10 min (such as reporting every 10 minutes). As can be seen in the table, there is 1 sensor device in group 2. The sensor device in group 2 may for example act as the coordinator electronic device. For example, a third scheduling group, group 3, may comprise sensor devices measuring temperatures in a third measurement range of 8-10° C., which have a third reporting frequency of 15 min (such as reporting every 15 minutes). As can be seen in the table, there is 3 sensor devices in group 2. For example, a fourth scheduling group, group 4, may comprise sensor devices measuring temperatures in a fourth measurement range of 6-8° C., which have a fourth reporting frequency of 60 min (such as reporting every 60 minutes). As can be seen in the table, there is 23 sensor devices in group 4. For example, a fifth scheduling group, group 5, may comprise sensor devices measuring temperatures in a fifth measurement range of −30-6° C., which have a fifth reporting frequency of 60 min (such as reporting every 60 minutes). As can be seen in the table, there is 3 sensor devices in group 5. This example may for example be for a refrigerating truck where it may be important to keep a low temperature (for example below 10° C.). It may therefore be useful to monitor the temperature measured in the refrigerating truck. Further, as it can be seen in table 1, it may be relevant to report the measured temperature more often (such as every 15 min, 10 min, and/or 5 min) for temperatures above 8° C., and in turn monitor the temperature in the truck (such as in an area of the truck where the sensor device is positioned) more often, when a sensor device measures higher temperatures (for example higher than a threshold for a refrigerating truck). On the other hand, it may be advantageous that the sensor devices measuring temperatures below 8° C. report less often (such as every 60 min) for example to lower the power consumption of the sensor devices.

In one or more example coordinator electronic devices, the processor circuitry 302 is configured to receive a first request from the first sensor device 304A, (such as a discovery request for a coordinator electronic device, for example a device acting as a collaboration coordinator within a network, such as local area network). In one or more embodiments, the first request may be received prior to obtaining the sensor data. In one or more embodiments, the first request may be received with the obtaining the sensor data (such as at the same time, for example the first request is comprised in the sensor data). The first request may comprise sensor data. In other words, the sensor data may comprise the first request. The first request may be an onboarding request. For example, an onboarded sensor device makes a discovery request for a device acting as coordinator electronic device (such as collaboration coordinator) within the local area network. The coordinator electronic device can be called master and may be responsible for forming the scheduling groups (such as collaboration clusters) and scheduling data reporting within a scheduling group (such as a collaboration cluster).

In one or more example coordinator electronic devices, the sensor device 304A is internal to the electronic device 300A. In other words, the coordinator electronic device 300A may comprise the sensor device 304A (such as the coordinator electronic device is configured to comprise the sensor device). In other words, the sensor device 304A is comprised in the coordinator electronic device 300A.

In one or more example coordinator electronic devices, the sensor data comprises a first measurement parameter. The first measurement parameter may comprise a temperature from a thermometer, a position parameter from a GPS, an acceleration from a sensor device such as an accelerometer, a light parameter from a photo-sensor, a sound parameter (such as voice) from a microphone, photo or video from a camera, pressure from a pressure sensor, and/or humidity from a hygrometer.

In one or more example coordinator electronic devices, the processor circuitry 302 is configured to determine, based on the sensor data obtained, the first configuration parameter indicative of scheduling of reporting from the first sensor device (such as scheduling sensed value reporting). In one or more example coordinator electronic devices, the determining of the first configuration parameter is based on the first measurement parameter obtained from the first sensor device.

In one or more example coordinator electronic devices, the determining of the first configuration parameter is based on a size of the scheduling group. In other words, the determining of the first configuration parameter may be based on the size of the scheduling group associated with a measurement range (such as an assigned temperature range). In one or more embodiments, the size of the scheduling group may be indicative of a number of sensor devices of the scheduling group (such as the amount of sensor devices of the scheduling group). In one or more embodiments, the size of the scheduling group may be indicative of a number of parameters sensed by the one or more sensor devices (such as if the number of parameters is related to the sensing frequency, for example the sensing frequency is based on the size of the scheduling group). For example, the determining of the configuration parameter may be based on a size of the scheduling group (such as the reporting frequency may be more or less frequent depending on the number of sensor devices in the scheduling group). For example, a larger number of sensor devices may result in a lower reporting frequency (such as reporting less often), thereby lowering the power consumption of each sensor device.

For example, the determining of the configuration parameter may be based on a size of the scheduling group, such as a predetermined time period (for example an available time period for the group) may vary depending on the number of sensor devices assigned to the scheduling group and/or the number of measurement parameters. For example, the determining of the first reporting time slot may be based on a size of the scheduling group.

For example, the determining of the configuration parameter may be based on a size of the scheduling group, such as the measurement range (for example a measurement range for the group) may vary depending on the number of sensor devices assigned to the scheduling group and/or the number of measurement parameters. For example, the determining of the first measurement range may be based on a size of the scheduling group.

In one or more example coordinator electronic devices, the sensor data comprises one or more of: environmental data, location data, and motion data.

The motion data may comprise accelerometer data and/or photo or video data. The location data may comprise position data from a sensor device such as a GPS.

The environmental data may comprise light data, sound data, temperature data, pressure data, and/or humidity data.

Optionally, the sensor device may comprise one or more of: an accelerometer, photo-sensor, a microphone, a camera, a thermometer, a pressure sensor, and a hygrometer.

In one or more example coordinator electronic devices, the processor circuitry 302 is configured to determine whether the obtained sensor data satisfies a criterion. The criterion may be based on the first measurement range. The first measurement range may be comprised in the configuration parameter. In other words, the processor circuitry 302 is configured to determine whether a measurement indicated by the sensor data is inside the first measurement range (for example, whether a measured temperature is inside the temperature range currently assigned to the first sensor device). For example, if the measured first measurement parameter (such as a sensed temperature) does not satisfy the criterion (such as deviates from the assigned temperature range), then the sensor device is configured to generate the update request and provide the update request to the coordinator electronic device (such as reports the deviation to the master device and/or the server). The coordinator electronic device may then be configured to provide an updated configuration parameter (in other words, the coordinator electronic device starts re-clustering). Thereby, an autonomous or automatic scheduling of reporting and/or re-clustering (such as resizing a scheduling group) of the one or more sensor devices may be achieved.

In one or more example coordinator electronic devices, the processor circuitry 302 is configured to update, based on the sensor data obtained, the first configuration parameter indicative of scheduling of reporting from the first sensor device, when it is not determined that the obtained sensor data satisfies the criterion.

In one or more example coordinator electronic devices, the processor circuitry 302 is configured to provide, to the first sensor device, an updated first configuration parameter.

In one or more example coordinator electronic devices, the processor circuitry 302 is configured to provide, to the scheduling group previously including the first sensor device (such as providing to each sensor device of the previous scheduling group), the updated first configuration parameter (such as a previously designated scheduling group). For example, the scheduling group previously including the first sensor device may be the scheduling group comprising the first sensor device, when it was not determined that the obtained sensor data satisfied the criterion (such as the scheduling group from which the sensor device was re-clustered).

In one or more example coordinator electronic devices, the processor circuitry 302 is configured to provide, to an updated scheduling group, which currently includes the first sensor device (such as providing to each sensor device of the updated scheduling group), the updated first configuration parameter (such as a newly designated scheduling group). For example, the scheduling group currently including the first sensor device may be the scheduling group comprising the first sensor device, when it was not determined that the obtained sensor data satisfied the criterion (such as the scheduling group to which the sensor device was re-clustered).

In one or more example coordinator electronic devices, the processor circuitry 302 is configured to provide, to the scheduling group previously including the first sensor device (such as providing to each sensor device of the previous scheduling group), an updated first reporting time slot, an updated first reporting frequency, an updated first measurement range, and/or an updated first identification information of a data acquisition server.

In one or more example coordinator electronic devices, the processor circuitry 302 is configured to provide, to the updated scheduling group, which currently includes the first sensor device (such as providing to each sensor device of the updated scheduling group), an updated first reporting time slot, an updated first reporting frequency, an updated first measurement range, and/or an updated first identification information of a data acquisition server.

In one or more example coordinator electronic devices, the processor circuitry 302 is configured not to update (such as forgo the updating), based on the sensor data obtained, the first configuration parameter indicative of scheduling of reporting from the first sensor device (such as maintaining or keeping the first configuration parameter), when it is determined that the obtained sensor data satisfies the criterion.

In one or more example coordinator electronic devices, the processor circuitry 302 is configured to refrain from providing, to the first sensor device, an updated first configuration parameter, when it is determined that the obtained sensor data satisfies the criterion.

The update of configuration parameter may be seen as a re-clustering or a re-grouping of the sensor device.

In one or more example coordinator electronic devices, the coordinator electronic device is configured to enter a power saving mode after providing the first configuration parameter. In other words, the coordinator electronic device may go to low power mode. In one or more embodiments, the coordinator electronic device may be configured to schedule when to exit the power saving mode (such as when to become active again). In one or more embodiments, the coordinator electronic device may be configured to schedule when to exit the power saving mode based on the configuration parameter provided to the sensor device (such as based on the scheduling of reporting of the sensor device). In other words, the coordinator electronic device may be configured to schedule when to exit the power saving mode based on the information of when the sensor device will be active. For example, in a scenario where the one or more sensor devices are assigned to an updated scheduling group, the coordinator electronic device may be configured to switch on a radio circuitry (such as a radio of the coordinator electronic device), whereby the coordinator electronic device may transmit data (such as send data, exchange data with the one or more sensor devices and/or a network), when the one or more sensor devices are active. In other words, updates about scheduling groups may be provided (such as distributed) when the one or more sensor devices are active (such as reachable). An advantage of this, is that the coordinator electronic device may be configured to be active during timeslots when the one or more sensor devices are active.

In some embodiments, the processor circuitry 302 may be configured to obtain first sensor data from the first sensor device 304A, (such as first temperature data, being indicative of for example a temperature measured by the first sensor device) and second sensor data from a second sensor device (such as second temperature data, being indicative of for example a temperature measured by the second sensor device).

In some embodiments, the processor circuitry 302 may be configured to provide to the second sensor device, based on the sensor data obtained, a second configuration parameter indicative of scheduling of reporting from the second sensor device.

In some embodiments, the processor circuitry 302 may be configured to obtain first primary sensor data from the sensor circuitry 304A acting as a first sensor circuitry (such as first primary accelerometer data, being for example a first acceleration) and second primary sensor data from a second sensor circuitry (such as second primary sound data, being for example a first sound).

Figure 2B:
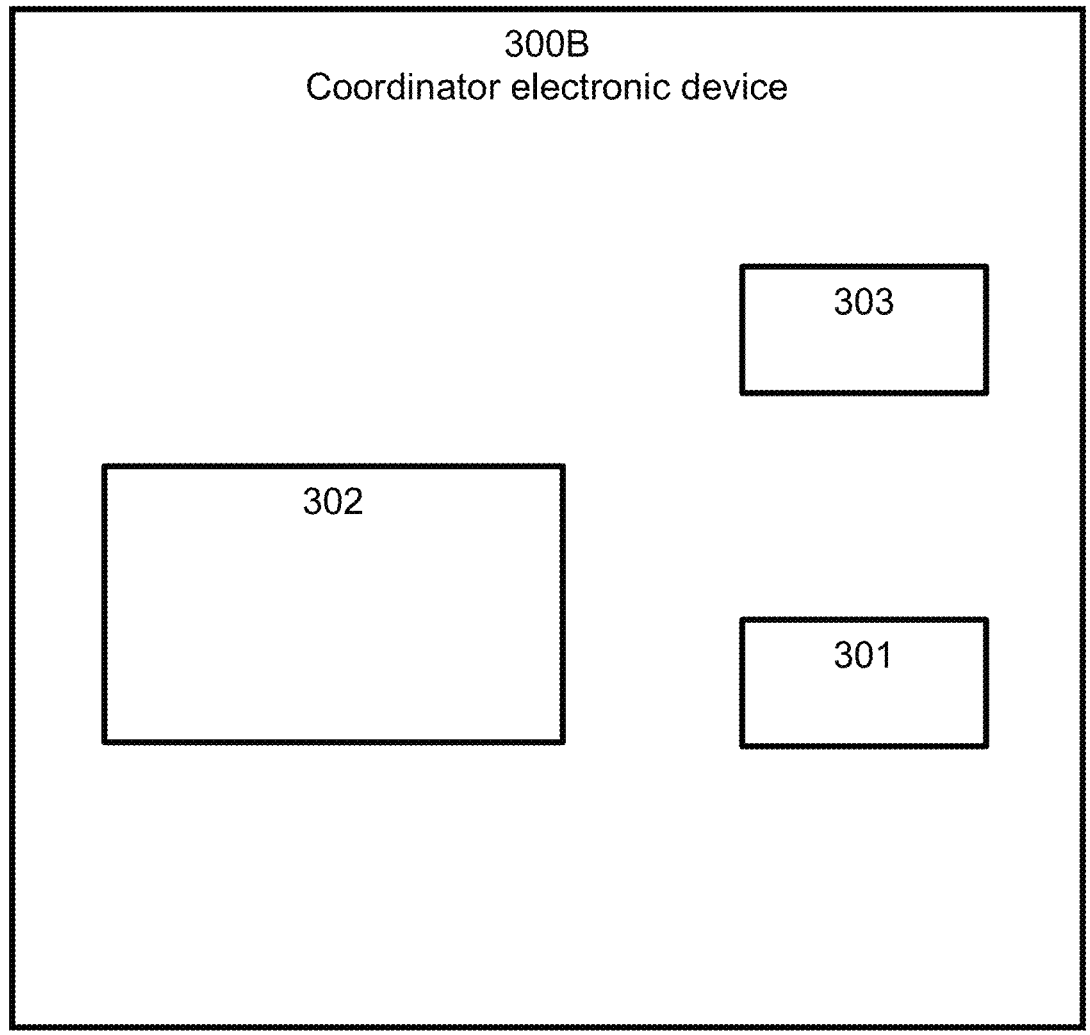
FIG. 2B is a block diagram illustrating an example coordinator electronic device according to this disclosure.

FIG. 2B is a block diagram illustrating an example coordinator electronic device 300B according to some embodiments of the present disclosure.

The coordinator electronic device 300B may for example comprise a portable electronic device, a wireless device, and/or an IoT device. The coordinator electronic device may for example be a master device and/or a collaboration coordinator.

The coordinator electronic device 300B comprises a memory circuitry 301, a processor circuitry 302, and an interface circuitry 303. In some embodiments, the interface circuitry 303 may be configured to operatively connect the coordinator electronic device to an external network, for example wirelessly and/or through a wired connection (such as to connect to a cloud network, a cellular network, for example long term evolution, LTE, and/or a local area network, LAN, connection).

The processor circuitry 302 is configured to obtain sensor data from a first sensor device 304B, (such as configured to obtain a current sensed temperature, a reporting frequency, a temperature range, and/or identification of data acquisition server). The sensor data may be data such as accelerometer data from a sensor device such as an accelerometer, light data from a photo-sensor, sound (such as voice) data from a microphone, photo or video data from a camera, temperature data from a thermometer, pressure data from a pressure sensor, and/or humidity data from a hygrometer.

Optionally, the first sensor device may comprise one or more of: an accelerometer, photo-sensor, a microphone, a camera, a thermometer, a pressure sensor, and a hygrometer.

In some embodiments, the processor circuitry 302 may be configured to obtain first sensor data from the first sensor device 304B (such as first temperature data, being indicative of for example a temperature measured by the first sensor device) and second sensor data from a second sensor device (such as second temperature data, being indicative of for example a temperature measured by the second sensor device).

In some embodiments, the processor circuitry 302 may be configured to obtain first primary sensor data from the sensor circuitry 304B acting as a first sensor circuitry (such as first primary accelerometer data, being for example a first acceleration) and second primary sensor data from a second sensor circuitry (such as second primary sound data, being for example a first sound).

The processor circuitry 302 is configured to provide to the first sensor device, based on the sensor data obtained, a first configuration parameter indicative of scheduling of reporting from the first sensor device.

In one or more example coordinator electronic devices, the first sensor device 304B is a sensor device external to the coordinator electronic device 300B.

Figure 4:
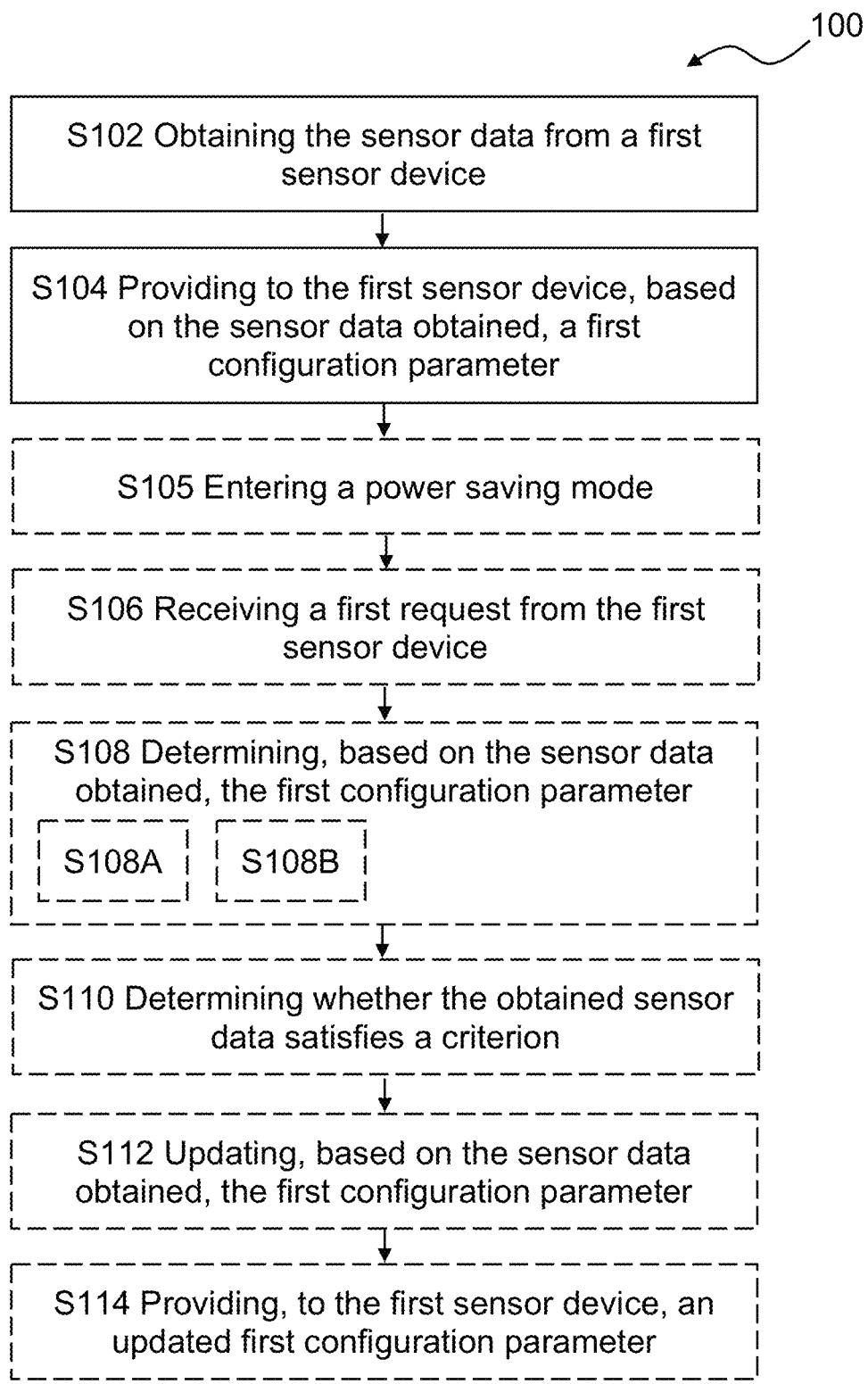
FIG. 4 is a flow-chart illustrating an example method, performed at a coordinator electronic device, for scheduling sensor data reporting according to this disclosure.

The coordinator electronic device 300A, 300B is optionally configured to perform any of the operations disclosed in FIG. 4 (such as any one or more of S105, S106, S108, S108A, S108B, S110, S112, S114). The operations of the coordinator electronic device 300A, 300B may be embodied in the form of executable logic routines (e.g., lines of code, software programs, etc.) that are stored on a non-transitory computer readable medium (e.g., the memory circuitry 301) and are executed by the processor circuitry 302).

Furthermore, the operations of the coordinator electronic device 300A, 300B may be considered a method that the coordinator electronic device 300A, 300B is configured to carry out. Also, while the described functions and operations may be implemented in software, such functionality may as well be carried out via dedicated hardware or firmware, or some combination of hardware, firmware and/or software.

The memory circuitry 301 may be one or more of a buffer, a flash memory, a hard drive, a removable media, a volatile memory, a non-volatile memory, a random access memory (RAM), or other suitable device. In a typical arrangement, the memory circuitry 301 may include a non-volatile memory for long term data storage and a volatile memory that functions as system memory for the processor circuitry 302. The memory circuitry 301 may exchange data with the processor circuitry 302 over a data bus. Control lines and an address bus between the memory circuitry 301 and the processor circuitry 302 also may be present (not shown in FIG. 2A, 2B). The memory circuitry 301 is considered a non-transitory computer readable medium.

The memory circuitry 301 may be configured to store the configuration parameter and/or the sensor data in a part of the memory.

Furthermore, the operations of the coordinator electronic device may be considered a method that the coordinator electronic device is configured to carry out. Also, while the described functions and operations may be implemented in software, such functionality may as well be carried out via dedicated hardware or firmware, or some combination of hardware, firmware and/or software.

Figure 3:
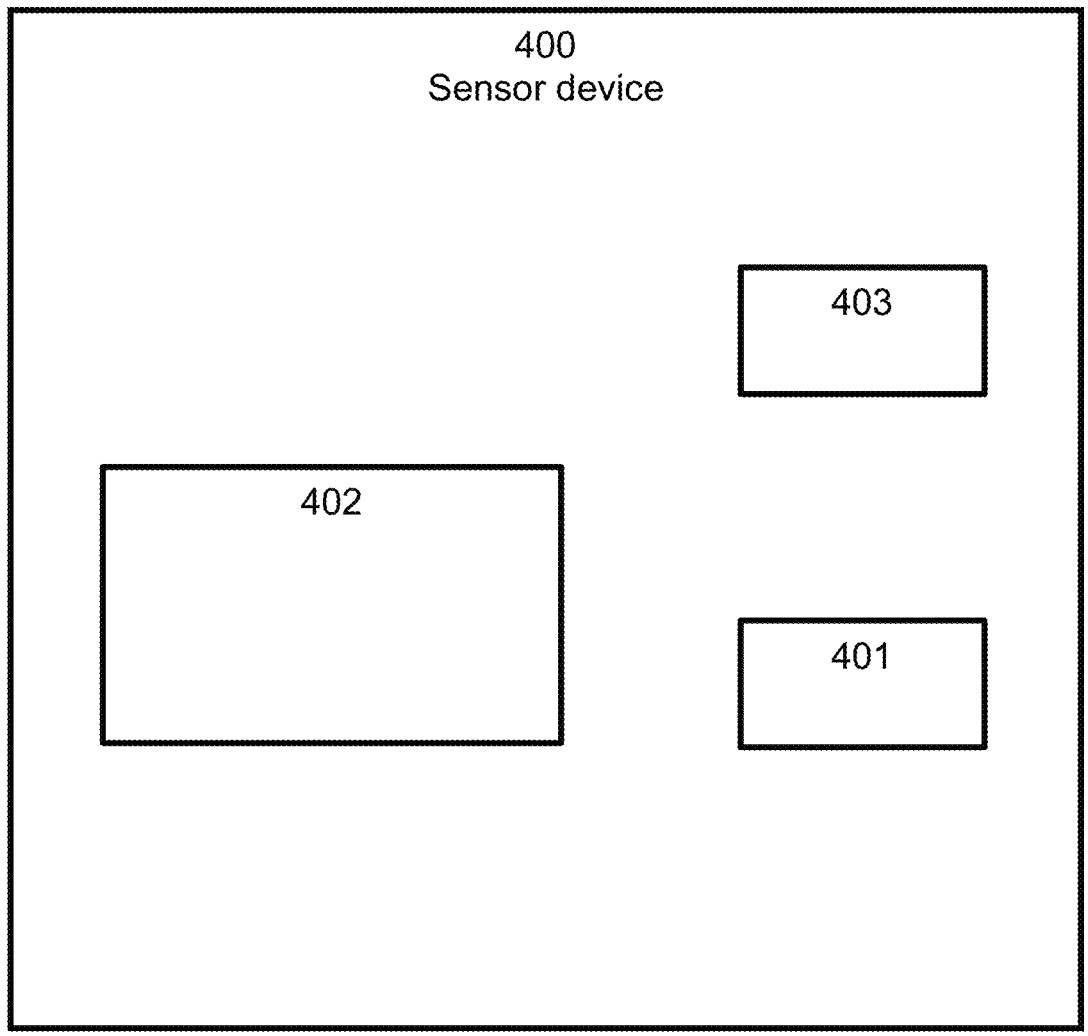
FIG. 3 is a block diagram illustrating an example sensor device according to this disclosure.

FIG. 3 is a block diagram illustrating an example sensor device 400 according to some embodiments of the present disclosure.

The sensor device 400 may for example comprise a portable electronic device, a wireless device, and/or an IoT device. Optionally, the sensor device may be referred to as temperature sensing device, IOT device, temperature sensor, tracking device, and/or tracker.

The sensor device 400 comprises a memory circuitry 401, a processor circuitry 402, and an interface circuitry 403. In some embodiments, the interface circuitry 403 may be configured to operatively connect the sensor device to an external network and/or an internal network (such as a local network, for example a network of a coordinator electronic device), for example wirelessly and/or through a wired connection (such as to connect to a cloud network, a cellular network, for example long term evolution, LTE, and/or a local area network, LAN, connection). In one or more embodiments, one or more sensor devices may be present (such as a plurality of sensor devices).

Optionally, the sensor device 400 may comprise one or more of: an accelerometer, photo-sensor, a microphone, a camera, a thermometer, a pressure sensor, and a hygrometer.

The processor circuitry 402 is configured to provide sensor data to a coordinator electronic device 300A, 300B, (such as configured to provide a request, a current sensed temperature, a reporting frequency, a temperature range, and/or identification of data acquisition server).

The sensor data may comprise data such as accelerometer data from a sensor device such as an accelerometer, position data from a sensor device such as a GPS, light data from a photo-sensor, sound (such as voice) data from a microphone, photo or video data from a camera, temperature data from a thermometer, pressure data from a pressure sensor, and/or humidity data from a hygrometer.

Optionally, the sensor device may comprise one or more of: an accelerometer, photo-sensor, a microphone, a camera, a thermometer, a pressure sensor, and a hygrometer.

The processor circuitry 402 is configured to receive, from the coordinator electronic device 300A, 300B, based on the sensor data, a configuration parameter indicative of scheduling of reporting from the sensor device.

In one or more example sensor devices, the processor circuitry 402 is configured to provide a first request to the coordinator electronic device 300A, 300B. In other words, the processor circuitry 402 is configured to transmit a first request to the coordinator electronic device 300A, 300B. In other words, the sensor device may send a request to the coordinator electronic device (such as to send a request to join a collaboration cluster). In one or more example sensor devices, to provide a first request comprises to exchange, with the coordinator electronic device, one or more of the following information: sensor data (such as a first measurement parameter (such as a current sensed temperature), a currently assigned reporting frequency and/or temperature ranges), a configuration parameter (such as a first identifier indicative of a scheduling group for the first sensor device, a first reporting time slot, a first reporting frequency, a first measurement range, and/or a first identification information of a data acquisition server). An advantage of this may be that the sensor device knows when to sense and/or when to report, thereby the data traffic and power consumption may be reduced (for example by only exchanging data at an initial setup or configuration).

In one or more example sensor devices, prior to providing a first request to the coordinator electronic device, the sensor device may send a discovery request (such as a service discovery, for example a service query) for a coordinator electronic device. An advantage of this, is that the sensor device may not need to be pre-configured (such as pre-configured with an address to the coordinator device). For example, a sensor device is onboarded as a node in a local area network (for example associated with an area, such as a vehicle, and/or a building and/or a room, and/or a warehouse). For example, the onboarded sensor device makes a discovery request (such as discover request) for a device acting as coordinator electronic device (such as collaboration coordinator) within the local area network. This coordinator electronic device can be called master and may be responsible for forming the scheduling groups (such as collaboration clusters) and scheduling data reporting within a scheduling group (such as a collaboration cluster).

In one or more example sensor devices, the sensor device is configured to measure a first measurement parameter. In one or more example sensor devices, the processor circuitry 402 is configured to generate, based on the first measurement parameter, the sensor data. In one or more example sensor devices, the sensor device is configured to transmit the sensor data according to the configuration parameter. For example, the sensor device is configured to determine a time slot, such as a future time slot, based on the configuration parameter, such as based on a reference time and/or a reporting frequency (such a time delta) used to report sensor data (such as a sensed temperature). In other words, the configuration parameter may be used by the sensor device to schedule a reporting of the sensor data (such as schedule an upload of the sensor data), such as to determine a time slot for transmitting the sensor data, such as to determine a periodicity of the transmissions of the sensor data. In one or more example embodiments, the configuration parameter comprises one or more of: an identifier indicative of a scheduling group for the sensor device (such as assigned or onboarded to a scheduling group or cluster having an associated temperature range within which the sensed temperature of the sensor device falls), a reporting time slot, a reporting frequency, a measurement range, and an identification information of a data acquisition server. For example, the sensor device may be configured to determine the time slot for transmission of the sensor data, based on a reference time and a reporting frequency (such a time delta). For example, the sensor device may be configured to transmit the sensor data according to the configuration parameter, such as to the data acquisition server indicated in the configuration parameter, such as at a time slot derived based on the configuration parameter. Optionally, the scheduling group may be referred to as cluster, group, category, classification, and/or batch.

For example, one or more sensor devices of a scheduling group may take turn at transmitting the sensor data (such as each sensor device takes turn at transmitting its sensor data) during their time slot. The sensor device may identify its scheduling group based on the configuration parameter comprising identifier indicative of a scheduling group for the sensor device. In other words, one or more sensor devices of a scheduling group may take turn at reporting the sensed temperature to the coordinator electronic device during their time slot. The coordinator electronic device may then transmit the received sensor data to the network (such as to the data acquisition server).

In one or more example sensor devices, the processor circuitry 402 is configured to determine whether the first measurement parameter satisfies a first criterion. In one or more example sensor devices, the criterion is based on the received configuration parameter.

In one or more example sensor devices, the processor circuitry 402 is configured to generate, based on the configuration parameter received, an update request (such as part of the sensor data and/or part of the first request), when it is not determined that the first measurement parameter satisfies the first criterion.

In one or more example sensor devices, the processor circuitry 402 is configured to provide, to the coordinator electronic device 300A. 300B, the update request. The update request may for example be a request to the coordinator electronic device to receive an updated configuration parameter (such as to be reassigned to another temperature range, for example to be reassigned to another cluster).

The first criterion may be based on the first measurement range. The first measurement range may be comprised in the configuration parameter. In other words, the processor circuitry 402 is configured to determine whether a measured temperature is inside the temperature range currently assigned to the sensor device. For example, if the measured first measurement parameter (such as a sensed temperature) does not satisfy a first criterion (such as deviates from the assigned temperature range), then the sensor device is configured to generate the update request and provide the update request to the coordinator electronic device (such as reports the deviation to the master device and/or the server). The coordinator electronic device may then be configured to provide an updated configuration parameter (in other words, the coordinator electronic device starts re-clustering). Thereby, an autonomous or automatic scheduling of reporting and/or re-clustering (such as resizing a scheduling group) of the one or more sensor devices may be achieved.

For example, the sensor device may be configured to send a request to the coordinator electronic device to be reassigned to another scheduling group (such as reassigned to another cluster). The coordinator electronic device may then be configured to provide an updated configuration parameter (such as assigning the sensor device to a new measurement range, such as a new temperature range), and the sensor device may then be assigned to another scheduling group associated to the updated configuration parameter (such as associated to the new temperature range associated with the scheduling group). The coordinator electronic device may then be configured to provide an updated configuration parameter (such as assigning the sensor device with a new reporting time slot, such as a new reference time). The coordinator electronic device may then be configured to provide an updated configuration parameter (such as assigning the sensor device with a new reporting frequency, such as a new time delta). In one or more embodiments, the coordinator electronic device is configured to provide an updated configuration parameter based on the size of the scheduling group (such as a cluster size). In one or more embodiments, the sensor device may be configured to update (such as reschedule) its reporting time slot, update its reporting frequency, update its measurement range, and/or update its identification information of a data acquisition server based on the updated configuration parameter.

In one or more example sensor devices, the processor circuitry 402 may be configured not to generate (such as forgo the generating), based on the configuration parameter, the update request (such as maintaining or keeping the first request), when it is determined the first measurement parameter satisfies the first criterion.

In one or more example sensor devices, the processor circuitry 402 is configured to refrain from providing, to the coordinator electronic device, the update request, when it is determined that the first measurement parameter satisfies the first criterion.

In one or more example sensor devices, the sensor device 400 act as the coordinator electronic device 300A, 300B. In other words, the sensor device 400 may be configured to act as a coordinator electronic device (such as the sensor device may be configured to perform any of the actions performed by the coordinator electronic device disclosed herein, and in FIG. 5). In other words, the sensor device may act as a collaboration coordinator for one or more sensor devices. In other words, if there is no coordinator electronic device, the sensor device itself may take the role as coordinator electronic device (such as the role as master).

In one or more example sensor devices, the sensor device 400 is configured to enter a power saving mode after providing the sensor data according to the configuration parameter.

In one or more example sensor devices, the sensor device 400 is configured to determine whether the first measurement parameter satisfies a second criterion. The second criterion may be based on a threshold and/or a range (such as a measurement range). In one or more example sensor devices, the sensor device 400 is configured to provide the sensor data, based on the first measurement parameter, to the coordinator electronic device 300A, 300B when it is not determined that the sensor data satisfies the second criterion.

For example, determining whether the first measurement parameter satisfies a second criterion may comprise determining whether the first measurement parameter indicates measurements which are equal or below a threshold. For example, when the first measurement parameter indicates measurements which are above the threshold (for example, the second criterion is not satisfied), the sensor device is configured to provide the sensor data to a coordinator electronic device 300A, 300B. For example, determining whether the first measurement parameter satisfies a second criterion may comprise determining whether the first measurement parameter indicates measurements which are within the range. For example, when the first measurement parameter indicates measurements which are not within the range (for example, the second criterion is not satisfied), the sensor device is configured to provide the sensor data to a coordinator electronic device 300A, 300B. This may lead to less frequent reporting of sensor data, and thereby reduces the communication load during periods where sensed data (such as sensed measurements) are substantially stationary, such as substantially the same (such as within a range). The period where sensed data (such as sensed measurements) are substantially stationary, such as substantially the same (such as within a range) may in some scenarios be long. For example, in a scenario where the sensor device comprises a positioning device, the measured position may be reported less frequently if the sensor device is not moving. For example, in a scenario where the sensor device comprises a thermometer and/or a light sensor, and the sensor device is arranged in a refrigerated truck and is configured to measure a temperature inside the truck and/or to measure the light intensity inside the truck, when a door of the truck is opened, the temperature and light intensity will increase. In that situation, the sensor device may be configured to increase the reporting frequency (such as to monitor the temperature inside the truck more precisely for a time period).

In one or more example sensor devices, the processor circuitry 402 is configured to refrain from providing, to the coordinator electronic device, the sensor data, when it is determined that the sensor data satisfies the second criterion.

Figure 5A:
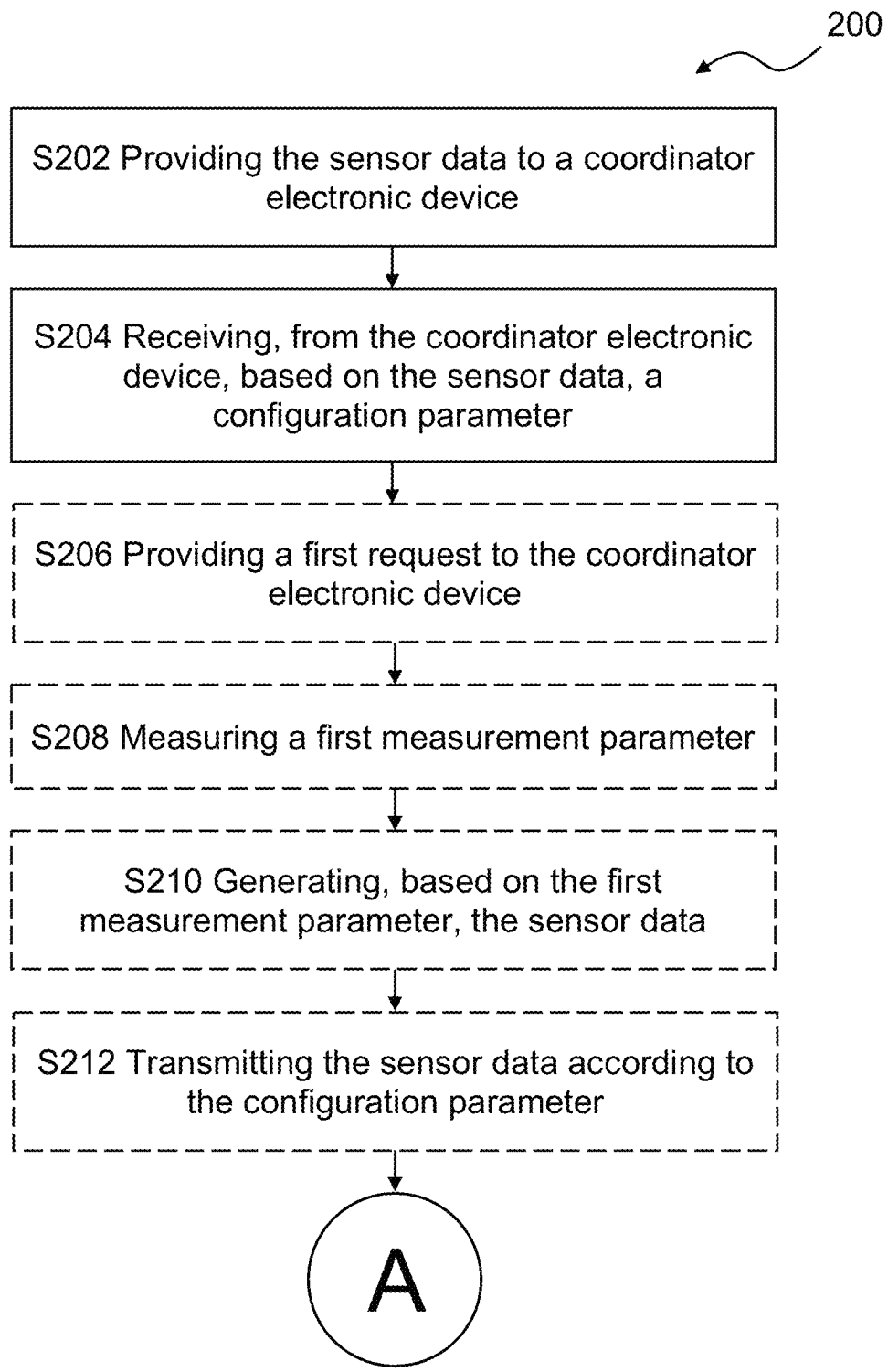
FIGS. 5A, 5B is a flow-chart illustrating an example method, performed at a sensor device, for scheduling sensor data reporting according to this disclosure.
Figure 5B:
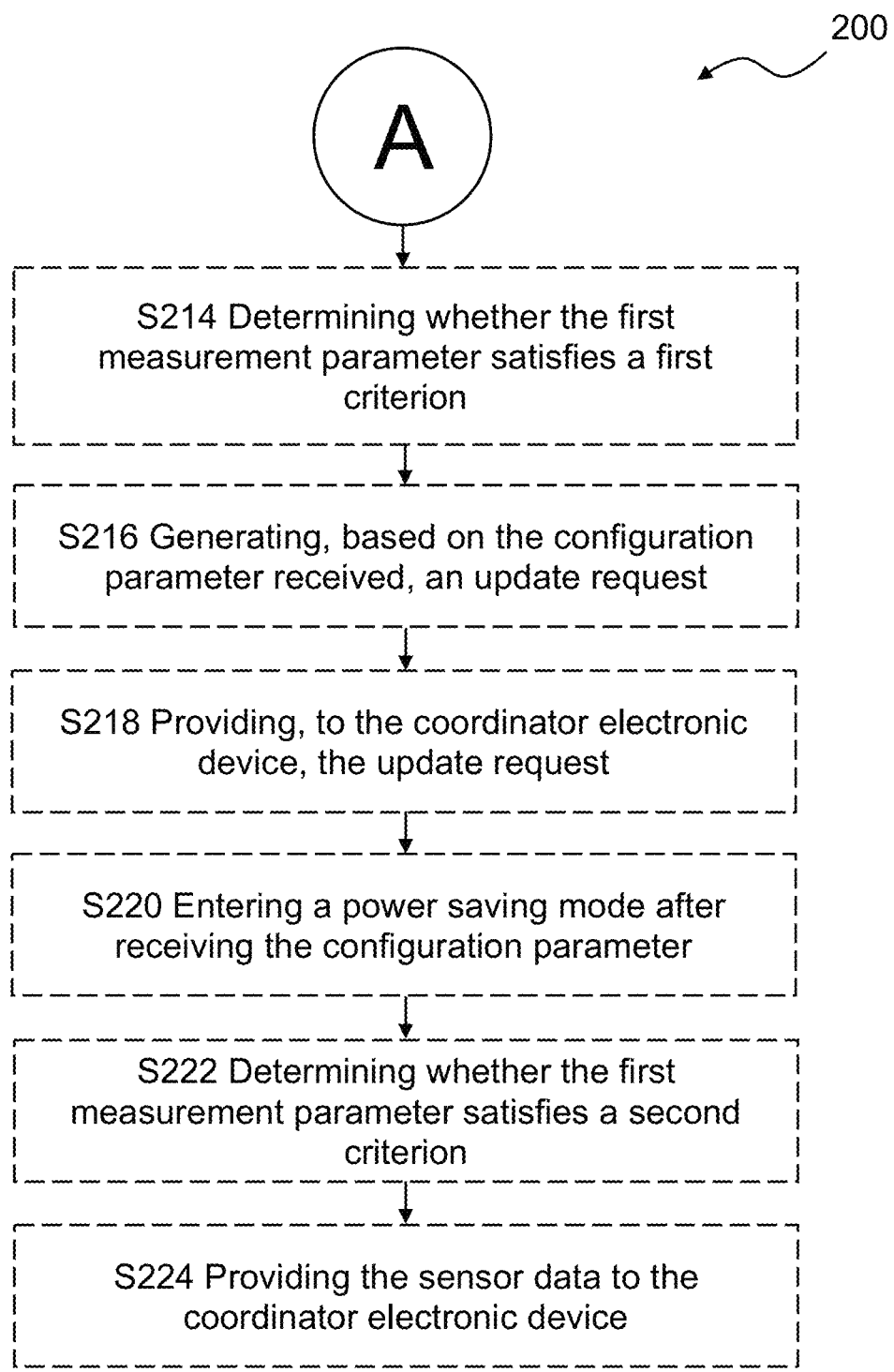

The sensor device 400 is optionally configured to perform any of the operations disclosed in FIG. 5A, 5B (such as any one or more of S206, S208, S210, S212, S214, S216, S218, S220, S222, S224). The operations of the sensor device 400 may be embodied in the form of executable logic routines (e.g., lines of code, software programs, etc.) that are stored on a non-transitory computer readable medium (e.g., the memory circuitry 401) and are executed by the processor circuitry 402).

Furthermore, the operations of the sensor device 400 may be considered a method that the sensor device 400 is configured to carry out. Also, while the described functions and operations may be implemented in software, such functionality may as well be carried out via dedicated hardware or firmware, or some combination of hardware, firmware and/or software.

The memory circuitry 401 may be one or more of a buffer, a flash memory, a hard drive, a removable media, a volatile memory, a non-volatile memory, a random access memory (RAM), or other suitable device. In a typical arrangement, the memory circuitry 401 may include a non-volatile memory for long term data storage and a volatile memory that functions as system memory for the processor circuitry 402. The memory circuitry 401 may exchange data with the processor circuitry 402 over a data bus. Control lines and an address bus between the memory circuitry 401 and the processor circuitry 402 also may be present (not shown in FIG. 3). The memory circuitry 401 is considered a non-transitory computer readable medium.

The memory circuitry 401 may be configured to store the configuration parameter and/or the sensor data in a part of the memory.

FIG. 4 shows a flow-chart illustrating an example method 100 performed by a coordinator electronic device, for scheduling sensor data reporting (such as the coordinator electronic device disclosed herein, such as the coordinator electronic device 300A, 300B of FIG. 2A-B).

The method comprises obtaining S102 the sensor data from a first sensor device.

The method comprises providing S104 to the first sensor device, based on the sensor data obtained, a first configuration parameter indicative of scheduling of reporting from the first sensor device.

In one or more example methods, the method comprises receiving S106 a first request from the first sensor device.

In one or more example methods, the first sensor device is a sensor device internal to the coordinator electronic device.

In one or more example methods, the first sensor device is a sensor device external to the coordinator electronic device.

In one or more example methods, the sensor data comprises a first measurement parameter.

In one or more example methods, the first configuration parameter comprises one or more of: a first identifier indicative of a scheduling group for the first sensor device, a first reporting time slot, a first reporting frequency, a first measurement range, and a first identification information of a data acquisition server.

In one or more example methods, the method comprises determining S108, based on the sensor data obtained, the first configuration parameter indicative of scheduling of reporting from the first sensor device.

In one or more example methods, the determining S108 of the first configuration parameter comprises determining S108A the first configuration parameter based on the first measurement parameter obtained from the first sensor device.

In one or more example methods, the determining S108 of the first configuration parameter comprises determining S108B the first configuration parameter based on a size of the scheduling group.

In one or more example methods, the sensor data comprises one or more of: environmental data, location data, and motion data.

In one or more example methods, the method comprises determining S110 whether the obtained sensor data satisfies a criterion.

In one or more example methods, the method comprises updating S112, based on the sensor data obtained, the first configuration parameter indicative of scheduling of reporting from the first sensor device, when it is not determined that the obtained sensor data satisfies the criterion.

In one or more example methods, the method comprises providing S114, to the first sensor device, an updated first configuration parameter.

In one or more example methods, the method comprises refraining from providing, to the first sensor device, an updated first configuration parameter, when it is determined that the obtained sensor data satisfies the criterion.

In one or more example methods, the method comprises entering S105 a power saving mode after providing S104 the first configuration parameter.

FIGS. 5A and 5B shows a flow-chart illustrating an example method 200 performed by a sensor device, for a scheduling sensor data reporting (such as the sensor device disclosed herein, such as the sensor device 400, 304A, 304B of FIG. 2A, 2B, FIG. 3).

The method comprises providing S202 the sensor data to a coordinator electronic device.

The method comprises receiving S204, from the coordinator electronic device, based on the sensor data, a configuration parameter indicative of scheduling of reporting from the sensor device.

In one or more example methods, the method comprises providing S206 a first request to the coordinator electronic device.

In one or more example methods, the method comprises measuring S208 a first measurement parameter.

In one or more example methods, the method comprises generating S210, based on the first measurement parameter, the sensor data.

In one or more example methods, the method comprises transmitting S212 the sensor data according to the configuration parameter.

In one or more example methods, the method comprises determining S214 whether the first measurement parameter satisfies a first criterion.

In one or more example methods, the criterion is based on the received configuration parameter.

In one or more example methods, the method comprises generating S216, based on the configuration parameter received, an update request, when it is not determined that the first measurement parameter satisfies the first criterion.

In one or more example methods, the method comprises providing S218, to the coordinator electronic device, the update request.

In one or more example methods, the method comprises not generating (such as forgo the generating), based on the configuration parameter, the update request (such as maintaining or keeping the first request), when it is determined the first measurement parameter satisfies the first criterion.

In one or more example methods, the method comprises to refraining from providing, to the coordinator electronic device, the update request, when it is determined that the first measurement parameter satisfies the first criterion.

In one or more example methods, the sensor device acts as the coordinator electronic device.

In one or more example methods, the method comprises entering S220 a power saving mode after providing the sensor data according to the configuration parameter.

In one or more example methods, the method comprises determining S222 whether the first measurement parameter satisfies a second criterion.

In one or more example methods, the method comprises providing S224 the sensor data to the coordinator electronic device when it is not determined that the first measurement parameter satisfies the second criterion.

In one or more example methods, the method comprises to refraining from providing, to the coordinator electronic device, the sensor data, when it is determined that the sensor data satisfies the second criterion.

Embodiments of methods and products (coordinator electronic devices and sensor devices) according to the disclosure are set out in the following items:

Item 1. A coordinator electronic device (300A, 300B) comprising:
  a memory circuitry (301);
  an interface circuitry (303); and
  a processor circuitry (302);
  the processor circuitry (302) being configured to:
    obtain sensor data from a first sensor device (304A, 304B); and
    provide to the first sensor device, based on the sensor data obtained, a first configuration parameter indicative of scheduling of reporting from the first sensor device.

Item 2. Coordinator electronic device according to item 1, wherein the processor circuitry (302) is configured to:
  receive a first request from the first sensor device (304A, 304B).

Item 3. Coordinator electronic device according to any of items 1-2, wherein the first sensor device is a sensor device internal to the coordinator electronic device.

Item 4. Coordinator electronic device according to any of items 1-3, wherein the first sensor device is a sensor device external to the coordinator electronic device.

Item 5. Coordinator electronic device according to any of items 1-4, wherein the sensor data comprises a first measurement parameter.

Item 6. Coordinator electronic device according to any of items 1-5, wherein the first configuration parameter comprises one or more of: a first identifier indicative of a scheduling group for the first sensor device, a first reporting time slot, a first reporting frequency, a first measurement range, and a first identification information of a data acquisition server.

Item 7. Coordinator electronic device according to any of items 1-6, wherein the processor circuitry (302) is configured to:
  determine, based on the sensor data obtained, the first configuration parameter indicative of scheduling of reporting from the first sensor device.

Item 8. Coordinator electronic device according to item 7, wherein the determining of the first configuration parameter is based on the first measurement parameter obtained from the first sensor device.

Item 9. Coordinator electronic device according to any of items 7-8, wherein the determining of the first configuration parameter is based on a size of the scheduling group.

Item 10. Coordinator electronic device according to any of the preceding items, wherein the sensor data comprises one or more of: environmental data, location data, and motion data.

Item 11. Coordinator electronic device according to any of the preceding items, wherein the processor circuitry (302) is configured to:
  determine whether the obtained sensor data satisfies a criterion;
  update, based on the sensor data obtained, the first configuration parameter indicative of scheduling of reporting from the first sensor device, when it is not determined that the obtained sensor data satisfies the criterion; and
  provide, to the first sensor device, an updated first configuration parameter.

Item 12. Coordinator electronic device according to any of the preceding items, wherein the coordinator electronic device is configured to enter a power saving mode after providing the first configuration parameter.

Item 13. A sensor device (400) comprising:
  a memory circuitry (401);
  an interface circuitry (403); and a processor circuitry (402) being configured to:
provide sensor data to a coordinator electronic device (300A, 300B); and
receive, from the coordinator electronic device (300A, 300B), based on the sensor data, a configuration parameter indicative of scheduling of reporting from the sensor device.

Item 14. Sensor device (400) according to item 13, wherein the processor circuitry (402) is configured to:
provide a first request to the coordinator electronic device (304A, 304B).

Item 15. Sensor device (400) according to any of items 13-14, wherein the sensor device is configured to:
measure a first measurement parameter; and
wherein the processor circuitry (402) is configured to generate, based on the first measurement parameter, the sensor data; and
wherein the sensor device is configured to transmit the sensor data according to the configuration parameter.

Item 16. Sensor device (400) according to item 15, wherein the processor circuitry (402) is configured to:
determine whether the first measurement parameter satisfies a first criterion, wherein the criterion is based on the received configuration parameter;
generate, based on the configuration parameter received, an update request, when it is not determined that the first measurement parameter satisfies the first criterion; and
provide, to the coordinator electronic device (300A, 300B), the update request.

Item 17. Sensor device (400) according to any of items 13-16, wherein the sensor device (400) act as the coordinator electronic device (300A, 300B).

Item 18. Sensor device (400) according to any of items 13-17, wherein the sensor device (400) is configured to enter a power saving mode after providing the sensor data according to the configuration parameter.

Item 19. Sensor device (400) according to any of items 13-18, wherein the sensor device (400) is configured to:
determine whether the first measurement parameter satisfies a second criterion; and
provide the sensor data to the coordinator electronic device (300A, 300B) when it is not determined that the first measurement parameter satisfies the second criterion.

Item 20. A method, performed by a coordinator electronic device, for scheduling sensor data reporting, the method comprising:
obtaining (S102) the sensor data from a first sensor device; and
providing (S104) to the first sensor device, based on the sensor data obtained, a first configuration parameter indicative of scheduling of reporting from the first sensor device.

Item 21. The method according to item 20, the method comprising receiving (S106) a first request from the first sensor device.

Item 22. The method according to any of items 20-21, wherein the first sensor device is a sensor device internal to the coordinator electronic device.

Item 23. The method according to any of items 20-22, wherein the first sensor device is a sensor device external to the coordinator electronic device.

Item 24. The method according to any of items 20-23, wherein the sensor data comprises a first measurement parameter.

Item 25. The method according to any of items 20-24, wherein the first configuration parameter comprises one or more of: a first identifier indicative of a scheduling group for the first sensor device, a first reporting time slot, a first reporting frequency, a first measurement range, and a first identification information of a data acquisition server.

Item 26. The method according to any of items 20-25, the method comprising determining (S108), based on the sensor data obtained, the first configuration parameter indicative of scheduling of reporting from the first sensor device.

Item 27. The method according to item 26, wherein the determining (S108) of the first configuration parameter comprises determining (S108A) the first configuration parameter based on the first measurement parameter obtained from the first sensor device.

Item 28. The method according to any of items 26-27, wherein the determining (S108) of the first configuration parameter comprises determining (S108B) the first configuration parameter based on a size of the scheduling group.

Item 29. The method according to any of items 20-28, wherein the sensor data comprises one or more of: environmental data, location data, and motion data.

Item 30. The method according to any of items 20-29, the method comprising:
determining (S110) whether the obtained sensor data satisfies a criterion;
updating (S112), based on the sensor data obtained, the first configuration parameter indicative of scheduling of reporting from the first sensor device, when it is not determined that the obtained sensor data satisfies the criterion; and
providing (S114), to the first sensor device, an updated first configuration parameter.

Item 31. The method according to any of items 20-30, wherein the method comprises entering (S105) a power saving mode after providing (S104) the first configuration parameter.

Item 32. A method, performed by a sensor device, for scheduling sensor data reporting, the method comprising:
providing (S202) the sensor data to a coordinator electronic device; and
receiving (S204), from the coordinator electronic device, based on the sensor data, a configuration parameter indicative of scheduling of reporting from the sensor device.

Item 33. The method according to item 32, the method comprising:
providing (S206) a first request to the coordinator electronic device.

Item 34. The method according to any of items 32-33, the method comprising:
measuring (S208) a first measurement parameter;
generating (S210), based on the first measurement parameter, the sensor data; and
transmitting (S212) the sensor data according to the configuration parameter.

Item 35. The method according to item 34, the method comprising:
determining (S214) whether the first measurement parameter satisfies a first criterion, wherein the criterion is based on the received configuration parameter;

generating (S216), based on the configuration parameter received, an update request, when it is not determined that the first measurement parameter satisfies the first criterion; and providing (S218), to the coordinator electronic device, the update request.

Item 36. The method according to any of items 32-35, wherein the sensor device acts as the coordinator electronic device.

Item 37. The method according to any of items 32-36, the method comprising entering (S220) a power saving mode after providing the sensor data according to the configuration parameter.

Item 38. The method according to items 32-37, the method comprising:

determining (S222) whether the first measurement parameter satisfies a second criterion; and providing (S224) the sensor data to the coordinator electronic device when it is not determined that the sensor satisfies the second criterion.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering. Furthermore, the labelling of a first element does not imply the presence of a second element and vice versa.

It may be appreciated that FIGS. 1A-3 comprises some circuitries or operations which are illustrated with a solid line and some circuitries or operations which are illustrated with a dashed line. The circuitries or operations which are comprised in a solid line are circuitries or operations which are comprised in the broadest example embodiment. The circuitries or operations which are comprised in a dashed line are example embodiments which may be comprised in, or a part of, or are further circuitries or operations which may be taken in addition to the circuitries or operations of the solid line example embodiments. It should be appreciated that these operations need not be performed in order presented. Furthermore, it should be appreciated that not all of the operations need to be performed. The example operations may be performed in any order and in any combination.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the example embodiments may be implemented at least in part by means of both hardware and software, and that several "means", "units" or "devices" may be represented by the same item of hardware.

The various example methods, devices, nodes and systems described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program circuitries may include routines, programs, objects, components, data structures, etc. that perform specified tasks or implement specific abstract data types. Computer-executable instructions, associated data structures, and program circuitries represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed disclosure, and it will be made obvious to those skilled in the art that various changes and modifications may be made without departing from the scope of the claimed disclosure. The specification and drawings are, accordingly, to be regarded in an illustrative rather than restrictive sense. The claimed disclosure is intended to cover all alternatives, modifications, and equivalents.

What is claimed is:

1. A coordinator electronic device comprising:
a memory circuitry;
an interface circuitry; and
a processor circuitry;
the processor circuitry being configured to:
obtain sensor data from a first sensor device;
provide to the first sensor device, based on the obtained sensor data, a first configuration parameter indicative of scheduling of reporting from the first sensor device; and
receive a first request from the first sensor device,
wherein the coordinator electronic device is configured to enter a power saving mode after providing the first configuration parameter indicative of scheduling of reporting from the first sensor device, and
wherein the coordinator electronic device is further configured to schedule when to exit the power saving mode based on the first configuration parameter indicative of scheduling of reporting from the first sensor device.

2. The coordinator electronic device according to claim 1, wherein the first sensor device is a sensor device internal to the coordinator electronic device.

3. The coordinator electronic device according to claim 1, wherein the first sensor device is a sensor device external to the coordinator electronic device.

4. The coordinator electronic device according to claim 1, wherein the sensor data comprises a first measurement parameter.

5. The coordinator electronic device according to claim 1, wherein the first configuration parameter comprises one or more of: a first identifier indicative of a scheduling group for the first sensor device, a first reporting time slot, a first reporting frequency, a first measurement range, and a first identification information of a data acquisition server.

6. The coordinator electronic device according to claim 1, wherein the processor circuitry is configured to:
determine, based on the obtained sensor data, the first configuration parameter indicative of scheduling of reporting from the first sensor device.

7. The coordinator electronic device according to claim 6, wherein the first configuration parameter is determined based on a size of a scheduling group.

8. The coordinator electronic device according to claim 1, wherein the processor circuitry is configured to:
 determine whether the obtained sensor data satisfies a criterion;
 update, based on the obtained sensor data, the first configuration parameter indicative of scheduling of reporting from the first sensor device, when it is not determined that the obtained sensor data satisfies the criterion; and
 provide, to the first sensor device, an updated first configuration parameter.

9. The coordinator electronic device according to claim 7, wherein the first configuration parameter is further determined based on a first measurement parameter obtained from the first sensor device.

10. The coordinator electronic device according to claim 1, wherein the sensor data comprises one or more of: environmental data, location data, and motion data.

11. A method, performed by a coordinator electronic device, for scheduling sensor data reporting, the method comprising:
 obtaining the sensor data from a first sensor device;
 providing to the first sensor device, based on the obtained sensor data, a first configuration parameter indicative of scheduling of reporting from the first sensor device;
 receiving a first request from the first sensor device;
 entering a power saving mode after providing the first configuration parameter indicative of scheduling of reporting from the first sensor device; and
 scheduling when to exit the power saving mode based on the first configuration parameter indicative of scheduling of reporting from the first sensor device.

12. The method according to claim 11, wherein the first configuration parameter comprises one or more of: a first identifier indicative of a scheduling group for the first sensor device, a first reporting time slot, a first reporting frequency, a first measurement range, and a first identification information of a data acquisition server.

13. The method according to 11, comprising determining, based on the obtained sensor data, the first configuration parameter indicative of scheduling of reporting from the first sensor device.

14. The method according to claim 13, wherein the determining the first configuration parameter is based on a first measurement parameter obtained from the first sensor device.

15. The method according to claim 13, wherein the determining the first configuration parameter is based on a size of a scheduling group.

16. The method according to claim 11, further comprising:
 determining whether the obtained sensor data satisfies a criterion;
 updating, based on the obtained sensor data, the first configuration parameter indicative of scheduling of reporting from the first sensor device, when it is not determined that the obtained sensor data satisfies the criterion; and
 providing, to the first sensor device, an updated first configuration parameter.

17. The method according to claim 11, wherein the first sensor device is a sensor device internal to the coordinator electronic device.

18. The method according to claim 11, wherein the first sensor device is a sensor device external to the coordinator electronic device.

19. The coordinator electronic device according to claim 8, wherein the processor circuitry is further configured to update the first configuration parameter by assigning the first sensor device to another scheduling group associated with the updated first configuration parameter.

20. The method according to 16, wherein updating the first configuration parameter further comprises assigning the first sensor device to another scheduling group associated with the updated first configuration parameter.

* * * * *